June 12, 1962 H. S. McCONKIE 3,038,516
COMBINATION TUBELESS TIRE AND TUBE
Filed Feb. 26, 1958

INVENTOR
HOWARD S. McCONKIE

BY *Trimie and Smiley*

ATTORNEYS

2

United States Patent Office 3,038,516
Patented June 12, 1962

3,038,516
COMBINATION TUBELESS TIRE AND TUBE
Howard S. McConkie, Fort Bragg, N.C.
(101 Etter St., Hot Springs, Ark.)
Filed Feb. 26, 1958, Ser. No. 717,624
6 Claims. (Cl. 152—349)

This invention relates to tires and more particularly to a tubeless tire provided with one or more inner tubes for blowout protection.

While tubeless tires have gained general commercial acceptance, they are subject to a number of disadvantages. These include: vulnerability to blowout or sudden collapse with consequent danger to the occupants of the vehicle; difficulty in installing and need for special tools to mount the tires on wheel rims; the danger of rolling the tires off the wheels on sharp turns when mounted on heavy or fast vehicles; the inability of readily ventilating the interior of the tire to prevent rotting by water condensed therein; and the difficulty of locating small leaks or blemishes in the tire without dismounting the tire or the wheel.

It is a primary object of this invention to obviate these disadvantages by provision of a plurality of air compartments within a tubeless type tire so that the wheel may be continued to be used safely even after sudden puncture of the tire.

Another object of the invention is to provide a pneumatic tire with a plurality of tubes, all inflated and therefore possessing equal air pressure, with expansibility of tubes being such that any one can be punctured and the remainder will expand to fully occupy the tire space, the size and air volumes in these tubes being variable and, if mounted in a tubeless type tire, all such tubes may be safety tubes as long as said tire holds its own air volume against leakage at rim or casing defect and the like.

A further object is to provide a plurality of safety tubes within a tire, said tubes being preformed with portions of reduced cross section to permit crossover of the tubes within the tire and access of short valve stems on each tube to the outboard side of the rim upon which the tire and tubes are mounted.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawing, wherein like reference characters indicate like parts throughout the several figures and in which:

Figure 1:
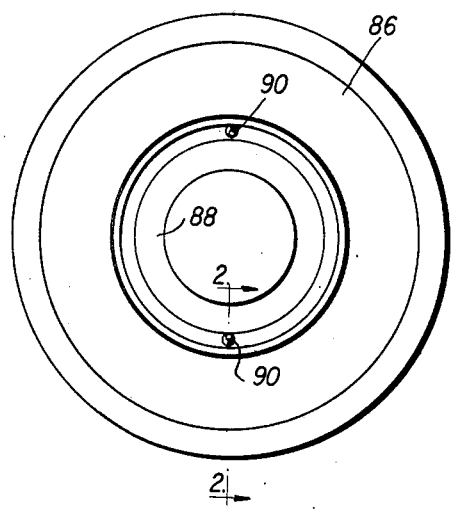
FIG. 1 is a side elevation of a wheel assembly embodying the invention which includes a tire mounted on a drop center rim and assembled with a pair of inner tubes within the tire.
Figure 2:
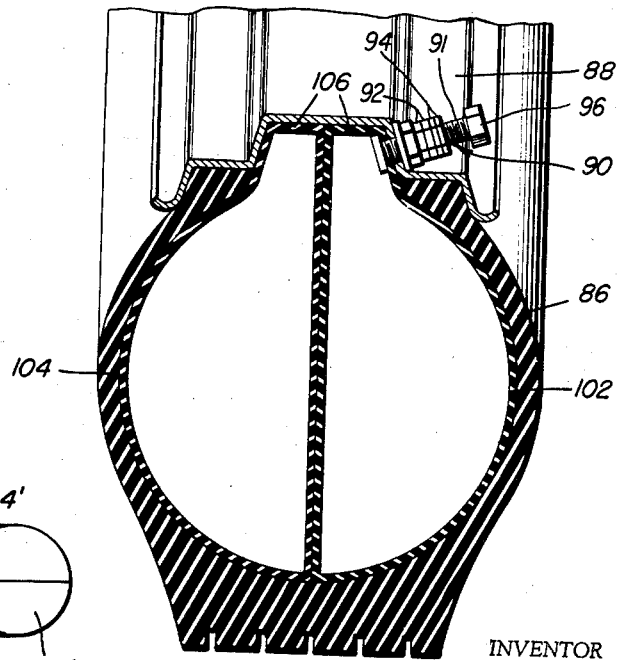
FIG. 2 is an enlarged section of the tire assembly taken on line 2—2 of FIG. 1 and showing a tire assembly utilizing a pair of inner tubes within a conventional tire of the tubeless or nontubeless type.

Referring now to the drawings, the invention is shown in FIGS. 1 and 2 embodied in a pair of completely independent inner tubes 102 and 104 side-by-side within a tire 86 mounted on a drop center rim 88. The details of construction of the tire are well-known to those skilled in the art and need not be described here.

Each tube will have its own valved air passage or stem 90 extending through respective openings in the rim 88, and will be kept constantly inflated. Such tubes may be inserted within a tubeless type tire and both the tire and the inner tube inflated, or the inner tubes may be placed in a tube type tire, which is not air sealed to the rim and in which the tubes occupy the entire space within the tire. This latter construction is illustrated in FIG. 2. The pair of tubes 102 and 104 are inflated to occupy all of the space within tire 86 mounted on rim 88. The tubes are of doughnut shape when individually inflated, each having the central opening 106, but complete distention of each tube laterally is prevented by the presence of the other tube so that in cross section, each tube is inflated to the shape of a semicircle. Each tube may be provided with a conventional valve stem, however, stems 90 are modified in a manner to be later described. If the pair of tubes is mounted in a tubeless type tire which is partially inflated, care must be observed that the valve stems 90 make air sealing engagement with their corresponding rim openings.

Figure 3:
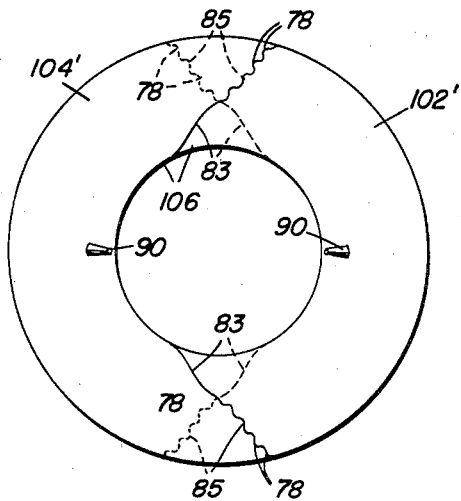
FIG. 3 is a side elevation in reduced size of the pair of inflated inner tubes of the embodiment shown in FIG. 2 with the wheel and rim omitted.
Figure 4:
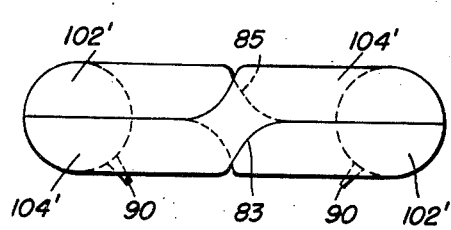
FIG. 4 is a top plan view of the inner tubes shown in FIG. 3.

In order that the valve stems may be accessible and held to a minimum length, it is desirable to cross the tubes 102 and 104 within the tire so that their valve stems may enter rim openings in the outboard side of the rim. This may be accomplished as shown in FIGS. 3 and 4. Preferably, each tube 102' and 104' is preformed during manufacture to provide notches 83, 85 or portions of reduced cross section where the crossovers occur. Preferably also, the notch areas are formed with ridges 78 to provide cooling air passages and reduce the friction at the tube crossover areas. Alternatively, these areas may be constructed with thickened rubber walls to better withstand increased friction between the tubes which will occur at these crossover areas. Desirably, the inner tube valve stems 90 are spaced apart approximately 180 degrees for balance. When the inner tubes are used with a tubeless type tire, which is also inflated, the valve stem for the tire should be equally spaced from the tube stems 90. In such case, stems 90 are spaced 120 degrees apart to secure better static and dynamic balance.

In the described embodiments of the invention wherein a plurality of tubes are installed within a tire of the tubeless type, a good vibrationless ride will result because the inner tubes are fixed to the rim by means of their valve stem and connecting nipples.

To improve dynamic balance of the wheel and lessen any shifting which takes place under extremely heavy loads or extremely fast speeds, it is desirable to accurately balance the assembled tire and inner tubes. This may be readily and easily accomplished by use of a tire or tube valve stem or the like, such as illustrated in FIG. 2. The valve stem 90 is preferably of metal construction and its external cylindrical surface 91 is threaded for its entire length. To balance the tire, a number of different weights 92 and 94 are threaded onto the valve stem. A similar weight 96 may form a cap for the valve stem. Each weight is fabricated in the form of an annulus or nut of lead or other heavy material. It is obvious that by selection of appropriate weights 92, 94 and 96 of different size and by adjustment of the distance that these are threaded upon the valve stem 90, one may readily balance the wheel.

The invention described above which contemplates the use of complete inner tubes in a tubeless type tire will result in greatly improved safety as long as the separate tubes are sealed in an airtight manner at the rim openings through which their valve stems protrude. When a pair or more of tubes, each inflated to the same pressure, is used, more safety air compartments are formed so that, even if the tire and one tube are punctured, the vehicle may continue to operate safely on the remaining unpunctured tube.

Although certain specific embodiments of the invention have been shown and described, it is obvious that many modifications thereof are possible. The invention, therefore, is not to be restricted except insofar as is necessitated by the prior art and by the spirit of the appended claims.

What is claimed and desired to be secured by Letters Patent is:

1. In combination, a tire mounted on a wheel rim having openings on one side thereof, a plurality of inner tubes within said tire, each having a valve stem mounted in air sealing engagement with the wall of one of said openings, said inner tubes crossing each other within the tire, and each inner tube being preformed with portions of reduced section at the crossing areas.

2. The combination according to claim 1 wherein at least one of said inner tubes is provided with a plurality of ridges in the area in which the tubes cross to reduce friction and permit passage of coiling air.

3. A vehicular pneumatic inner tube semicircular in cross section and of complete annular doughnut shape when inflated, said tube having preformed reduced sections asymmetrically disposed with respect to said semicircular cross section in areas that are 180 degrees apart about the tube, and said tube being adapted to complement a second like tube within a tire with the tubes crossing each other at their preformed reduced areas.

4. A vehicular pneumatic inner tube noncircular in cross section and doughnut shaped when inflated, said tube having preformed areas of constriction asymmetrically disposed with respect to said noncircular cross section with bearing ridges of tube material, spaced 180 degrees about the tube, and said tube being adapted to complement a second like tube within a tire with the tubes crossing each other at their preformed reduced areas.

5. In combination, a tire mounted on a wheel rim having openings on one side thereof, a plurality of inner tubes within said tire, each having a valve stem extending through one of said openings, said inner tubes crossing each other within the tire, and each inner tube being preformed with portions of reduced section at the crossing areas.

6. A vehicular pneumatic inner tube inflatable to form an annulus and having a predetermined shape in cross section, said tube being preformed with at least two spaced notches restricting the cross sectional area of the tube in preselected locations, said notches each extending only partly about the cross section of the tube and permitting said tube to be crossed at the notched locations with at least one like tube when assembled and inflated in a tire.

References Cited in the file of this patent

UNITED STATES PATENTS

| | | |
|---|---|---|
| Re. 17,662 | Spill | May 13, 1930 |
| 535,978 | Cooke | Mar. 19, 1895 |
| 668,994 | Mahana et al. | Feb. 26, 1901 |
| 882,905 | Marsh | Mar. 24, 1908 |
| 1,496,114 | Bonner | June 3, 1924 |
| 1,525,131 | Hitchcock | Feb. 3, 1925 |
| 1,574,056 | Powers | Feb. 23, 1926 |
| 1,833,879 | Ash | Nov. 24, 1931 |
| 1,975,415 | Williams | Oct. 2, 1934 |
| 2,038,473 | Bronson | Apr. 21, 1936 |
| 2,054,965 | Clo | Sept. 22, 1936 |
| 2,091,006 | Mayne | Aug. 24, 1937 |
| 2,150,648 | Eger | Mar. 14, 1939 |
| 2,167,398 | Tubbs | July 25, 1939 |
| 2,218,639 | Crowley | Oct. 22, 1940 |
| 2,255,932 | Kraft et al. | Sept. 16, 1941 |
| 2,290,975 | Laursen | July 28, 1942 |
| 2,334,893 | Arey | Nov. 23, 1943 |
| 2,375,127 | Mendelsohn | May 1, 1945 |
| 2,513,817 | Pennington | July 4, 1950 |
| 2,588,097 | Eiras | Mar. 4, 1952 |
| 2,608,235 | Wyman | Aug. 26, 1952 |
| 2,634,785 | Tubbs | Apr. 14, 1953 |
| 2,687,761 | Marick | Aug. 31, 1954 |
| 2,769,476 | Herzegh et al. | Nov. 6, 1956 |
| 2,861,619 | Wyman | Nov. 25, 1958 |
| 2,874,750 | Boyer | Feb. 24, 1959 |

FOREIGN PATENTS

| | | |
|---|---|---|
| 348,301 | France | Feb. 4, 1905 |
| 248,818 | Great Britain | Mar. 15, 1926 |
| 513,831 | Germany | Dec. 4, 1930 |
| 410,503 | Italy | Apr. 14, 1945 |